Dec. 19, 1950     F. F. MILLIGAN     2,534,616
COLLET WITH WORK GRIPPERS
Filed Dec. 29, 1948

INVENTOR.
FLETCHER F. MILLIGAN
BY
Richey & Watts
ATTORNEYS

Patented Dec. 19, 1950

2,534,616

UNITED STATES PATENT OFFICE 2,534,616

COLLET WITH WORK GRIPPERS

Fletcher F. Milligan, Cleveland, Ohio

Application December 29, 1948, Serial No. 67,804

8 Claims. (Cl. 279—51)

This invention relates to work-gripping devices for machine tools such as lathes, automatic screw machines, and the like, and, more particularly, it relates to the provision of pads or grippers in such devices for increasing the gripping force against the stock and preventing slipping of the stock in the device.

In many metal-forming operations involving the use of lathes, screw machines, and the like, bar stock is fed through the rotating spindle of the machine to the cutting tools. During the metal-working operation, the stock is gripped by means of a collet or chuck which generally comprises a split tubular member having stock-gripping fingers and wedge means for contracting the fingers about the work. Similarly, many automatic screw machines employ work-gripping devices called pushers, which reciprocate in the hollow spindle and feed the stock axially therethrough between cutting operations. In its broadest aspects it is an object of the invention to improve the gripping action of such work-gripping devices. This is accomplished by providing pads at the work-gripping members which cooperate with the members in such a manner that the pads are wedged radially inwardly when the stock tends to slip over the pads, thereby providing a strong, augmented grip on the stock that prevents further slippage.

Another object resides in quickly and positively restoring the pads to their neutral or non-gripping position when the gripping pressure is released. This is effectively accomplished in the preferred embodiment of the invention by mounting the pads in pockets and placing one or more bodies of rubber or rubber-like material between the forward and rearward edges of the pads and the circumferentially spaced end walls of the pockets. The rubber material provides a restoring means that has considerable force, is long-lasting, and occupies but a small space.

Although in its broader aspects the invention is not limited in its application to collets, a preferred application thereof is in connection with collets and such is described in the following detailed description.

The manner in which the aforesaid objects and advantages are attained will be apparent from the following detailed description of the invention.

Figure 1:
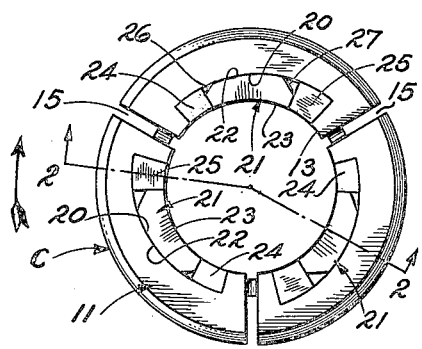
Fig. 1 is an end view of a collet embodying one form of the invention.

Referring to Fig. 1, the collet C is a generally tubular member which, as is common in the art, includes a shank 10 and an enlarged or tapered head portion 11. The shank 10 is bored as at 12 to receive the stock and a smaller bore 13 is provided in the tapered head to form stock-gripping surfaces. The tapered surface 14 of the head 11 engages a complementary taper in the machine spindle, and, since the collet is split as at 15, work-gripping fingers are provided. The fingers contract about and grip the stock when the collet is drawn into the spindle by means of the usual sleeve threaded to the collet as at 16.

Figure 2:
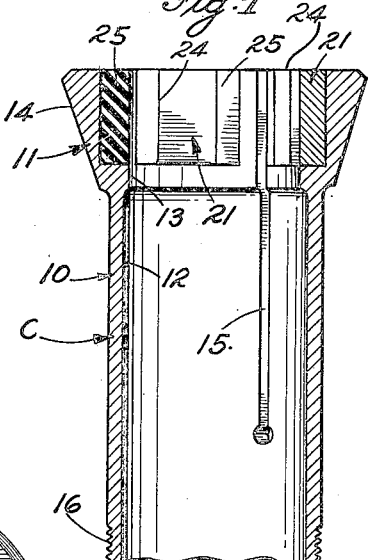
Fig. 2 is a longitudinal section taken on 2—2 of Fig. 1.

In the form shown in Figs. 1 and 2 a recess 20 is formed in the work-gripping wall of each finger adjacent the head 11. As best seen in Fig. 1, the recess is of a non-uniform radial depth, this depth increasing in the direction of rotation of the collet, as indicated by the arrow. As seen in Fig. 1, the shape of the generally circumferentially extending or bottom wall 20 of the recess is preferably the arc of a cylinder of greater radius than that of the bore 13, with its center displaced laterally from the center of the bore. However, the shape of wall 20 is not critical. Mounted in each recess is a stock-gripping pad 21 which preferably has an outer face 22 complementary to the curved wall 20 of the recess and each pad is formed with an inner, or stock-gripping, face 23 concentric with and of the same radius as that of bore 13.

In order to center the pads and to restore them to their neutral position when the gripping device is released, bodies 24 and 25 of rubber or rubber-like material are disposed between the edges of each pad and the associated end walls of each recess. The rubber-like bodies are preferably vulcanized to the collet body and may be vulcanized to the pads, if desired. In order to reduce the area of contact between the pads and the recess walls 20, the outer faces 22 of the pads are made shorter than the inner faces 23 by beveling the edges of the pads as at 26 and 27. For certain classes of work the faces 23 of the pads may be knurled or roughened to augment their grip on the work.

In operation, with the device of Figs. 1 and 2, when the collet is retracted the work is gripped in the collet and the pads are firmly pressed thereagainst. The collet is rotated as shown by the arrow in Fig. 1, and any tendency of the pads to slip over the stock urges the pads toward the narrow end of their recesses which wedges them radially inwardly. This action materially augments the grip of the pads against the stock and effectively prevents further slippage. The forward body of rubber 24 is now under compression and any relative motion of the pads is accommodated by the flow of rubber into the pocket formed by the bevel 26. When the collet is released the double pushing and pulling action of the two bodies of rubber upon the pads quickly and firmly restores them to their neutral, or retracted position.

In the form illustrated, the pads are disposed symmetrically about the inner circumference of the collet which makes them unidirectionally effective. It will be understood that if a collet that will rotate the stock in either direction is required, one of the pad and recess assemblies could be reversed to produce a wedging action opposite to that described. Of course, an even number of fingers could be formed whereupon an equal number of pads would be effective for either direction of rotation. I also contemplate that any well-known means may be employed to reduce the friction between the wedged surfaces of the pads and recesses. For example, bronze inserts may be provided, or the surfaces may be lubricated by oil holes filled with a felt wick leading to the wedge surfaces.

Figure 3:
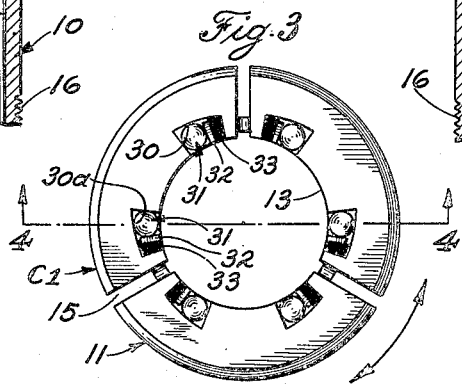
Fig. 3 is an end view of a collet embodying a modified form.

Referring to the form shown in Fig. 3, the mode of operation is very similar to that just described except that rollers are used to grip the stock instead of pads. The collet body is the same as that described except that a pair of recesses 30 and 30a are disposed oppositely in each finger. These recesses are of non-uniform depth to provide wedging surfaces, and a hardened and ground roller 31 is disposed in the deeper end of each recess, each roller preferably being tangent to the bore 13. In order to return the rollers to their retracted position, a small metal protecting strip 32 and a body of rubber-like material 33 are disposed between the narrow end of each recess and the associated roller.

Figure 4:
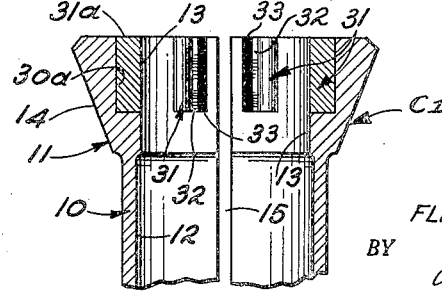
Fig. 4 is a section taken on 4—4 of Fig. 3.

In operation, if the collet in Figs. 3 and 4 is rotated in either direction and there is a tendency for the collet to slip over the stock, the rollers are urged toward the narrow end of the groove. With this they are wedged radially inwardly and firmly grip the stock. Material of the compressed rubber body flows into the space behind the protecting plate 32 to accommodate this action. When clamping pressure on the collet is relieved, rubber members 33 quickly and firmly return the rollers to their neutral or retracted position.

Figure 5:
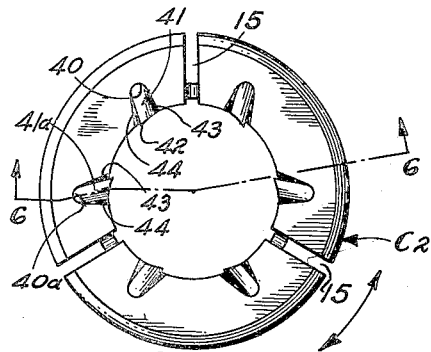
Fig. 5 is an end view of another form of the invention arranged in a collet; and, Fig. 6 is a section taken on 6—6 of Fig. 5.
Figure 6:
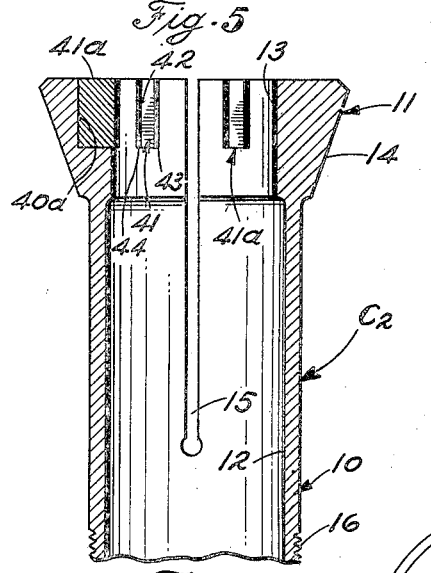

In the form shown in Figs. 5 and 6, the wedging action is obtained in a somewhat different manner. Here, as best seen in Fig. 5, a plurality of oppositely inclined axial recesses 40 and 40a are formed in the collet, preferably with rounded bottom walls. A plurality of grippers 41 and 41a, having rounded edges complementary to the bottom walls of the recesses, are disposed in the recesses. Each gripper is preferably formed with a toothed edge 42 for biting into the stock. In order to center the grippers, bodies of rubber 43 and 44 are vulcanized in place between the side edges of the recesses and grippers. The arrangement shown is bi-directional, and if slippage occurs or tends to occur in either direction one set of grippers will be pivoted about the bottom wall of their recesses causing the toothed edges to move radially inwardly and bite into the stock, thereby preventing further slippage.

The form shown in Figs. 1 and 2 is particularly adapted for service wherein it is desired to maintain the surface of the stock in a finished or unmarred condition. The same applies to the form shown in Figs. 3 and 4, except that soft stock might be slightly dented by the rollers with this arrangement. The form shown in Figs. 5 and 6 may cut the surface of the stock slightly, but in many cases the surface of the stock is machined after passing through the collet so this does not present any difficulty.

From the foregoing detailed description of the invention, it will be seen that a collet is provided which will firmly grip the stock and prevent all slippage of the collet over the stock during the metal-working operations. The rubber members form an important part of the invention because they provide a strong returning action, require but little space where space is at a premium, are economical to make and mount in place, and have a long life. It will be understood that the invention is not limited to the provision of wedge grippers and collets because by making the wedging surfaces axial instead of circumferential the form shown in Figs. 1 and 2 could be readily adapted to use in a pusher.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A bar stock gripping device for moving stock in a machine tool comprising a tubular member having a shank and an externally tapered portion at one end, the tapered end of said device being split to provide work-gripping fingers, an internal recess in the wall of at least one of said fingers, a relatively-flat wedge-like work-gripping pad slidably mounted in said recess, each recess and pad being of gradually increasing depth in the direction of motion imparted to said device while gripping the stock, whereby relative motion of said device and the stock in said direction tends to cause said pad to be wedged radially inwardly, and a body of rubber between the forward and rearward edges of the pad and the adjacent walls of the recess, said rubber bodies tending to restore the pad to its neutral position.

2. A collet comprising a tubular member having a shank and an externally tapered portion at one end, the tapered end of said collet being split to provide work-gripping fingers, an internal recess in the wall of at least one of said fingers, a curved wedge-like work-gripping pad slidably mounted in each recess, each recess and pad being of gradually increasing depth in the direction of rotation of the collet, whereby relative rotation of said collet and the stock tends to cause said pad to be wedged radially inwardly, and a body of rubber between the forward and rearward edges of the pad and the adjacent walls of the recess, said rubber bodies tending to restore the pad to its neutral position.

3. A collet comprising a tubular member having a shank and an enlarged tapered portion at one end, said collet being split to provide work-gripping fingers, internal axial recesses in the enlarged tapered portions of said fingers, rollers mounted in said recesses for general circumferential motion relative to said collet, said recesses being of gradually-increasing depth in one circumferential direction so that relative circumferential motion of said rollers and collet causes said rollers to be wedged radially inwardly, and resilient means disposed between one side of each roller and the adjacent side wall of the recess tending to restore each roller to its neutral position.

4. A collet comprising a tubular member having a shank and an enlarged tapered portion at one end, said collet being split to provide work-gripping fingers, internal axial recesses in the enlarged tapered portions of said fingers, rollers mounted in said recesses for general circumferential motion relative to said collet, said recesses being of gradually increasing depth in one circumferential direction so that relative circumferential motion of said rollers and collet causes said rollers to be wedged radially inwardly, and a body of rubber disposed between one side of each roller and the adjacent end wall of the recess tending to restore each roller to its neutral position.

5. A collet comprising a tubular member having a shank and an enlarged tapered portion at one end, said collet being split to provide work-gripping fingers, internal axial recesses in the enlarged tapered portions of said fingers, work grippers pivotally mounted in said recesses for general circumferential motion relative to said collet, relative circumferential motion of said rollers and collet causes said grippers to extend radially inwardly, and a body of rubber disposed between each side of the gripper and the adjacent end walls of the recesses tending to restore each gripper to its neutral position.

6. A bar stock gripping device for moving stock in a machine tool comprising a tubular member having a shank and an externally tapered portion at one end, the tapered end of said device being split to provide work-gripping fingers, an internal recess in the wall of at least one of said fingers, a work-gripping member slidably mounted in said recess, said recess being of gradually increasing radial depth progressing from its rearward edge to its forward edge in one direction of motion imparted to said device while gripping stock, whereby slippage of the stock in said device with the latter moving in said one direction tends to cause said work-gripping member to be wedged radially inwardly to grip the stock, and a body of rubber between said work-gripping member and one side wall of the recess.

7. A collet comprising a tubular member having a shank and an externally tapered portion at one end, the tapered end of said collet being split to provide work-gripping fingers, an internal recess in the wall of at least one of said fingers, a work-gripping member slidably mounted in said recess, said recess being of gradually increasing radial depth progressing circumferentially from its rearward edge to its forward edge in one direction of rotation imparted to said collet while gripping stock, whereby slippage of the stock in said collet with the latter rotating in said one direction tends to cause said work-gripping member to be wedged radially inwardly to grip the stock, and a body of rubber between said work-gripping member and one side wall of the recess.

8. A bar stock gripping device for moving stock in a machine tool comprising a tubular member having a shank and an externally tapered portion at one end, the tapered end of said device being split to provide work-gripping fingers, an internal recess in the wall of at least one of said fingers, a relatively-flat wedge-like work-gripping member slidably mounted in said recess, said recess being of gradually increasing radial depth progressing from its rearward edge to its forward edge in one direction of motion imparted to said device while gripping stock whereby slippage of the stock in said device with the latter moving in said one direction tends to cause said work-gripping member to slide rearwardly in said recess and to be wedged radially inwardly to grip the stock, and a body of rubber between one edge of said work-gripping member and the adjacent side wall of the recess.

FLETCHER F. MILLIGAN.

REFERENCES CITED

The following references are of record in the file of this patent:

UNITED STATES PATENTS

| Number | Name | Date |
| --- | --- | --- |
| 2,035,925 | Seamark | Mar. 31, 1936 |
| 2,134,468 | Bashana | Oct. 25, 1938 |
| 2,346,706 | Stoner | Apr. 18, 1944 |
| 2,382,060 | Ingalls | Aug. 14, 1945 |
| 2,403,136 | Stoner | July 21, 1946 |
| 2,459,899 | Stoner | Jan. 25, 1949 |